US008744366B1

(12) United States Patent  (10) Patent No.: US 8,744,366 B1
Steen  (45) Date of Patent: Jun. 3, 2014

(54) DIGITALLY PROGRAMMABLE CIRCUIT FOR CONTROLLING AN ATTENUATOR

(76) Inventor: Richard K. Steen, Pollok, TX (US)

(*) Notice: Subject to any disclaimer, the term of this patent is extended or adjusted under 35 U.S.C. 154(b) by 587 days.

(21) Appl. No.: 12/286,113

(22) Filed: Sep. 26, 2008

Related U.S. Application Data

(63) Continuation-in-part of application No. 10/122,575, filed on Apr. 15, 2002, now Pat. No. 7,430,412.

(51) Int. Cl.
*H04B 17/00* (2006.01)
(52) U.S. Cl.
USPC .............. 455/67.11; 455/67.13; 455/67.14; 455/226.1; 455/226.4; 455/68
(58) Field of Classification Search
USPC ............ 455/423, 67.11, 67.13, 115.1–115.4, 455/226.1–226.4, 68, 67.14
See application file for complete search history.

(56) References Cited

U.S. PATENT DOCUMENTS

| 3,581,198 | A | | 5/1971 | Shoemaker et al. |
| 3,622,877 | A | * | 11/1971 | MacDavid et al. ........... 375/222 |
| 3,905,131 | A | * | 9/1975 | Feezor et al. ................. 434/221 |
| 4,038,496 | A | * | 7/1977 | Feezor ............................ 73/585 |
| 4,105,960 | A | | 8/1978 | Bacher |
| 4,117,425 | A | | 9/1978 | Bacher |
| 4,191,995 | A | | 3/1980 | Farrow |
| 4,249,144 | A | | 2/1981 | Hurst et al. |
| 4,330,765 | A | | 5/1982 | Patukonis |
| 4,438,415 | A | | 3/1984 | Hopfer |
| 4,553,179 | A | * | 11/1985 | Inami et al. ...................... 360/66 |
| 4,618,230 | A | * | 10/1986 | Ens et al. ....................... 351/221 |
| 4,625,332 | A | | 11/1986 | Singer et al. |
| H481 | H | * | 6/1988 | Filardo et al. ................. 342/170 |
| 4,890,077 | A | | 12/1989 | Sun |
| 4,978,932 | A | | 12/1990 | Gupta et al. |
| 5,121,075 | A | | 6/1992 | Roach |
| 5,233,317 | A | | 8/1993 | Snodgrass et al. |
| 5,440,280 | A | | 8/1995 | Lord |
| 5,457,811 | A | * | 10/1995 | Lemson ..................... 455/67.11 |
| 5,502,421 | A | | 3/1996 | Nakahara |
| 5,524,060 | A | | 6/1996 | Silvast et al. |
| 5,703,909 | A | | 12/1997 | Fang et al. |
| 5,920,187 | A | | 7/1999 | Cosgrove et al. |
| 6,300,814 | B1 | | 10/2001 | Takahashi |
| 6,339,356 | B1 | | 1/2002 | Daughtry et al. |

(Continued)

OTHER PUBLICATIONS 4 pages(pp. 52,53?,54,55?) of catalog from General Microwave on Series 349 & 349H PIN diode attenuators, Year—1999.

*Primary Examiner* — Tuan Pham
(74) *Attorney, Agent, or Firm* — Law Office of William Gustavson, PC

(57) ABSTRACT

An apparatus (10) is disclosed for controlling a digitally controlled attenuator (30). The apparatus includes a programmable logic device (38), to control both the final value of attenuation and the rate of change of attenuation from the initial attenuation value in the attenuator (30) to the final value of attenuation. The apparatus forms a digital stair case ramp and steps the attenuator in such fine granular steps as to form essentially a continuously variable attenuator. Both the final value of attenuation and the rate of change of attenuation can be selected by the operator on the control panel (20) with attenuation select switches (22) and rate select switch (26). Alternatively, the attenuation can be input with an attenuation control knob (28). A digital display (24) displays the attenuation. The apparatus (10) can be remotely controlled with a GPIB or other remote control.

20 Claims, 14 Drawing Sheets

(56) References Cited

U.S. PATENT DOCUMENTS

| | | |
|---|---|---|
| 6,445,732 B1 | 9/2002 | Beamish et al. |
| 6,594,599 B1 * | 7/2003 | Kent et al. .................. 702/84 |
| 6,606,382 B2 * | 8/2003 | Gupta .................. 379/406.05 |
| 6,654,594 B1 | 11/2003 | Hughes et al. |
| 6,704,545 B1 | 3/2004 | Wala |
| 7,006,447 B1 | 2/2006 | Vaisanen et al. |
| 7,430,412 B1 | 9/2008 | Steen |
| 2003/0086371 A1 * | 5/2003 | Walton et al. ................. 370/235 |
| 2003/0161489 A1 * | 8/2003 | Peterson .................. 381/104 |
| 2004/0022215 A1 | 2/2004 | Okuhata et al. |
| 2005/0159124 A1 | 7/2005 | Shah |
| 2006/0118707 A1 * | 6/2006 | Schaake .................. 250/231.13 |

* cited by examiner

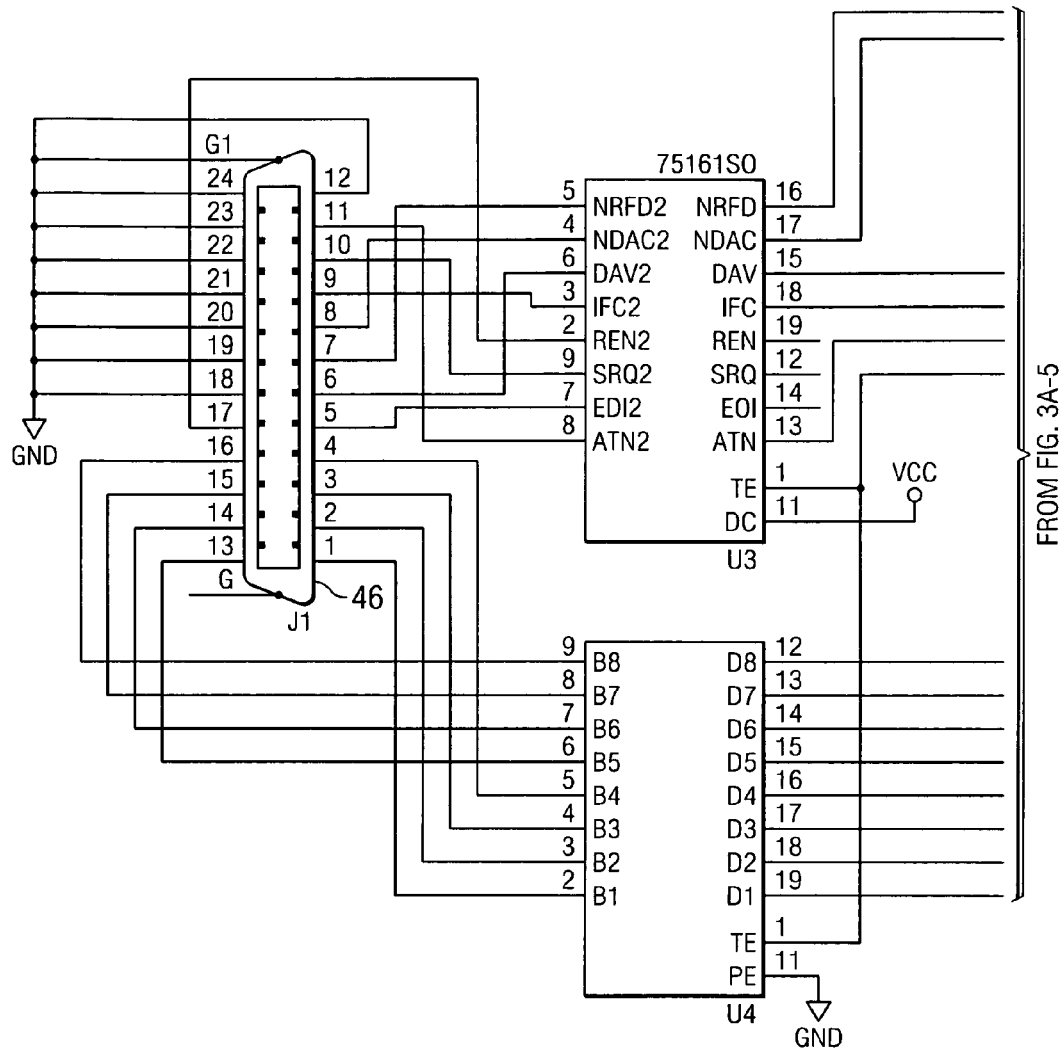
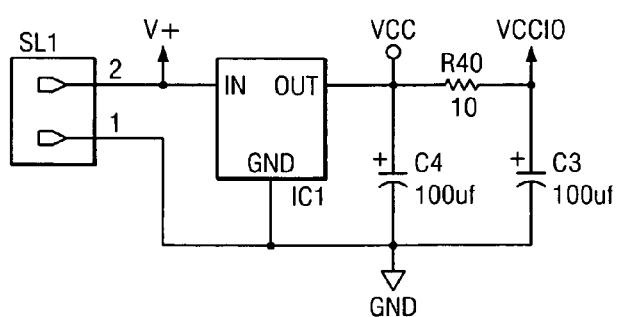
*FIG. 3A-4*

US 8,744,366 B1

DIGITALLY PROGRAMMABLE CIRCUIT FOR CONTROLLING AN ATTENUATOR

CROSS-REFERENCE TO RELATED APPLICATIONS

This application in a continuation-in-part of U.S. patent application Ser. No. 10/122,575 filed Apr. 15, 2002, now U.S. Pat. No. 7,430,412 issued Sep. 30, 2008

TECHNICAL FIELD

This invention relates to control of attenuators.

BACKGROUND OF THE INVENTION

Attenuators are commonly used in changing signal strength in an electronic circuit such as a receiver, transmitter and the like. A particular signal is fed into an attenuator where the operator attenuates the signal to the desired level to the input of the following circuit.

A variety of attenuators are known. The attenuator can be a simple manually operated attenuator where the operator moves a switch to different attenuation steps. Other attenuators are electronically operated by a control voltage set between certain limits controlling the degree of attenuation.

SUMMARY OF THE INVENTION

In accordance with one aspect of the present invention, a digital control circuit is provided which controls an attenuator having an signal input and a signal output. The attenuator attenuates the signal to a degree determined by a control signal input into the attenuator. A control is provided which has an input for the desired final attenuation value for the signal and an input for the desired rate of change of attenuation to achieve the desired final attenuation value. The control varies the control signal input into the attenuator to control the rate of change of attenuation of the attenuator to be the desired rate and to achieve the final attenuation value. The digital control circuit will step the attenuation in fine granular steps, forming a digital stair case ramp that appears to be a smooth seamless transition.

BRIEF DESCRIPTION OF THE DRAWINGS

A more complete understanding of the invention and its advantages will be apparent from the following Detailed Description when taken in conjunction with the accompanying Drawings, in which.

DETAILED DESCRIPTION

Figure 1:
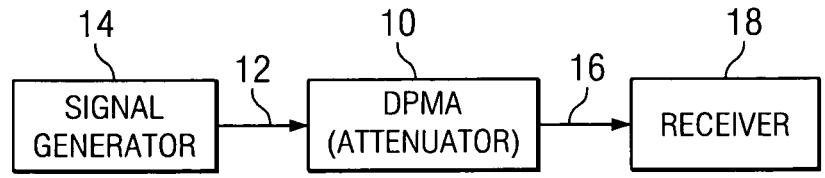
FIG. 1 is an illustration of a receiver testing circuit incorporating an apparatus forming a first embodiment of the present invention.

Referring now to the drawings, where like reference characters designate like or corresponding parts throughout the several views, there is illustrated an apparatus 10 forming a first embodiment of the present invention which forms a digitally programmable control circuit for an attenuator. The control circuit controls the attenuator to form, in effect, a continuously variable precision attenuator. While the apparatus 10 is described for controlling input to a microwave receiver, the apparatus 10 can be used in any application where fine granular steps of attenuation would be useful. For example, apparatus 10 can be used in controlling receiver input signal levels or even stabilizing rapid level changes at a receiver input. WiMax and LTE Mobile technology would benefit greatly from the circuit.

As will be explained hereinafter, the apparatus 10 forms a digital control circuit that is the equivalent of a digital stair case ramp to control the operation of an attenuator. The digital circuit will step in the finest granular steps. For example an 11 bit circuit will allow 0.04 dB per step when using a 0-80 dB range attenuator. The amount of digital control bits can be altered from 11 bits to accommodate any circuit design that needs to provide smooth seamless attenuation control.

The main purpose of this circuit is to take the smallest steps possible when transitioning between two attenuation levels without skipping any steps (at least steps perceptible to the device with which the attenuator is used). Instead of taking one giant jump or step from, say 0 to 20 dB, a step that would cause a receiver to loose phase lock, the attenuation would be broken up into many small, discrete steps, 500 0.04 dB steps in the example noted above, that will appear to be a smooth transition to the device fed from the attenuator.

As will be discussed hereinafter, the digital control circuit of apparatus 10 has timing controlled by a clock source. Therefore, when taking these small clocked steps, the rate of change of attenuation, or dB per second, can be precisely controlled by adjusting the clock frequency. There is no minimum clocking speed, or dB per second, and the only limitation is the maximum switching speed of the control chips (how fast the integrated circuit chips can change state or switch) and the frequency of the Master Clock forming the clock source.

The digital control circuit of apparatus 10 has many potential uses, especially in controlling receiver input signal levels or even stabilizing rapid level changes at a receiver's input. It would make it possible to reduce the chances of a receiver losing phase lock as the result of a rapid changing input signal level.

As seen FIG. 1, in one example of the use of apparatus, the apparatus 10 is connected between the output 12 of a signal generator 14 and the input 16 of a receiver 18 being tested. As will be described hereinafter, the apparatus 10 functions to attenuate the output signal from the signal generator 14 and also determine the rate of change of attenuation from a present value of attenuation to a desired final value of attenuation.

Figure 2:
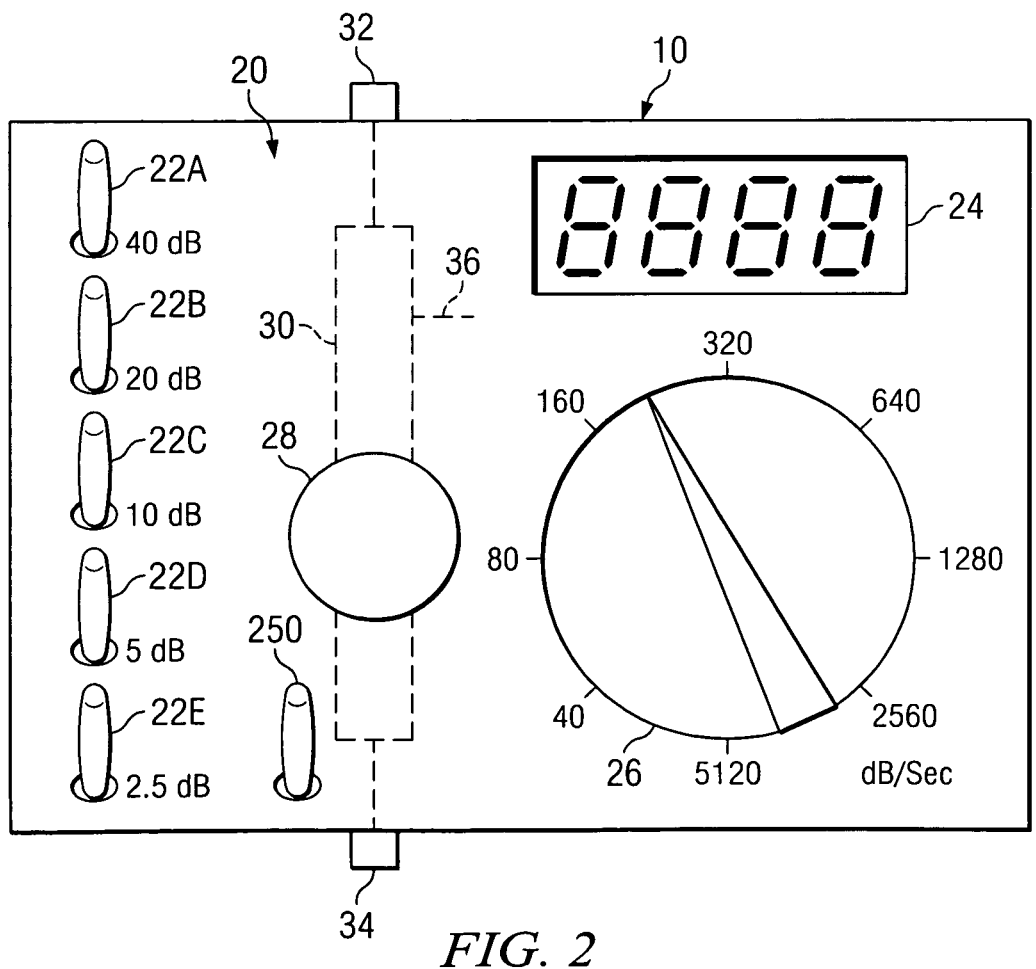
FIG. 2 is an illustration of the control panel of the apparatus.

With reference to FIG. 2, the apparatus 10 can be seen to have a control panel 20. On the control panel 20 are a series of the attenuation selection switches 22 a-e. The operator can select the desired final attenuation by operating the corresponding switch 22. Alternatively, the operator can select the final attenuation with an attenuation control knob 28. A digital display 24, preferably having four digits, provides for display of the current attenuation. A rate selection switch 26 permits the operator to set the rate of change of attenuation from the present attenuation value in the apparatus 10 to the desired final attenuation.

The apparatus 10 includes a variable attenuator which is controlled by a programable logic device (PLD) 38. The attenuator preferably is a pin diode attenuator 30. The attenuator 30 attenuates the signal entering input 32 of the apparatus 10 and outputs the attenuated signal at output 34. The attenuation is determined by a control signal to control input 36 of attenuator 30. The control signal is typically a digital signal. For example, one suitable type of attenuator 30 is the General Microwave programmable R. F. attenuator series 349 and 349H available from General Microwave Corporation. The series 349 attenuator provides an attenuation range up to about 80 dB in increments of 0.04 dB. The series 349 attenuator employs an 11 bit control signal which allows for a total of 2048 discrete attenuation steps. The series 349 attenuator is capable of switching in the order of 500-2000 ns. The 3496-80 attenuator is preferred, which has a frequency range of 4.5 to 13.5 G Hz. The PLD is preferably a model EPF10K20 P144 Programable Logic Device available from Altera, 101 Innovation Drive, San Jose, Calif. 95134. However, any digitally controlled attenuator can be used in substitution for attenuator 30 as required by the particular purpose to which the apparatus 10 is to used.

Figure 3A:
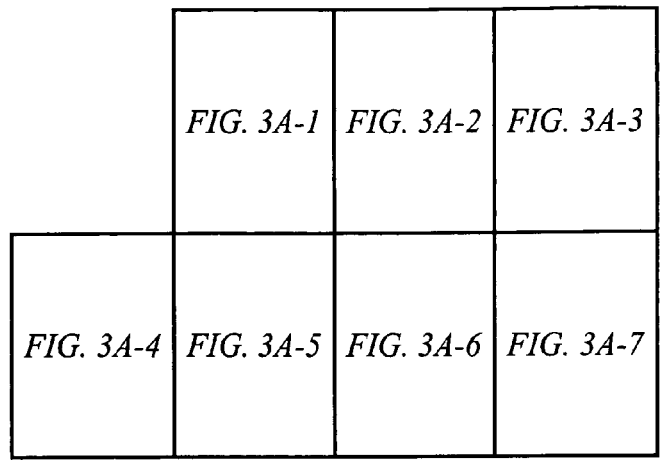
FIGS. 3A, and B are the schematic of the apparatus.
Figures 1, 3A:
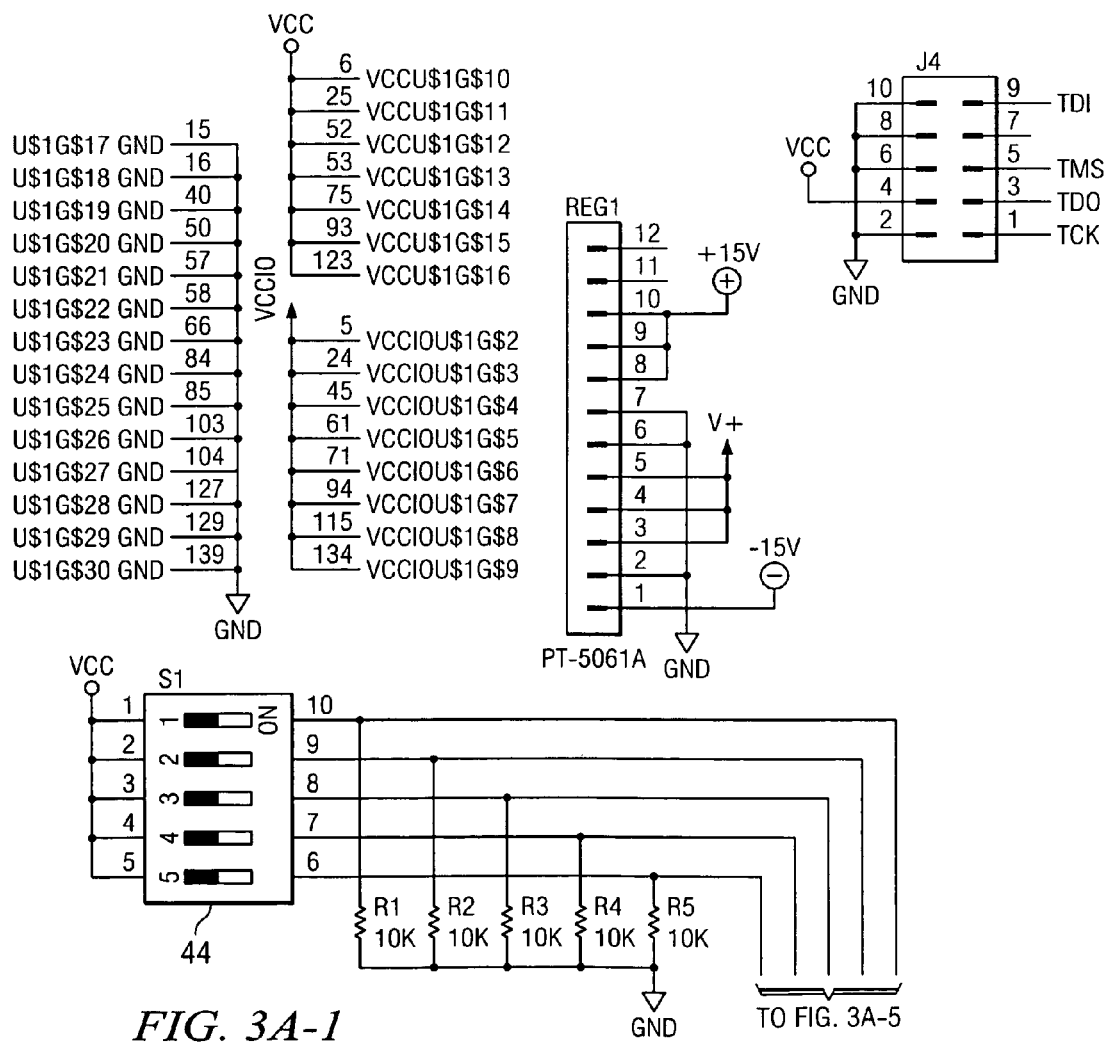
Figures 2, 3A:
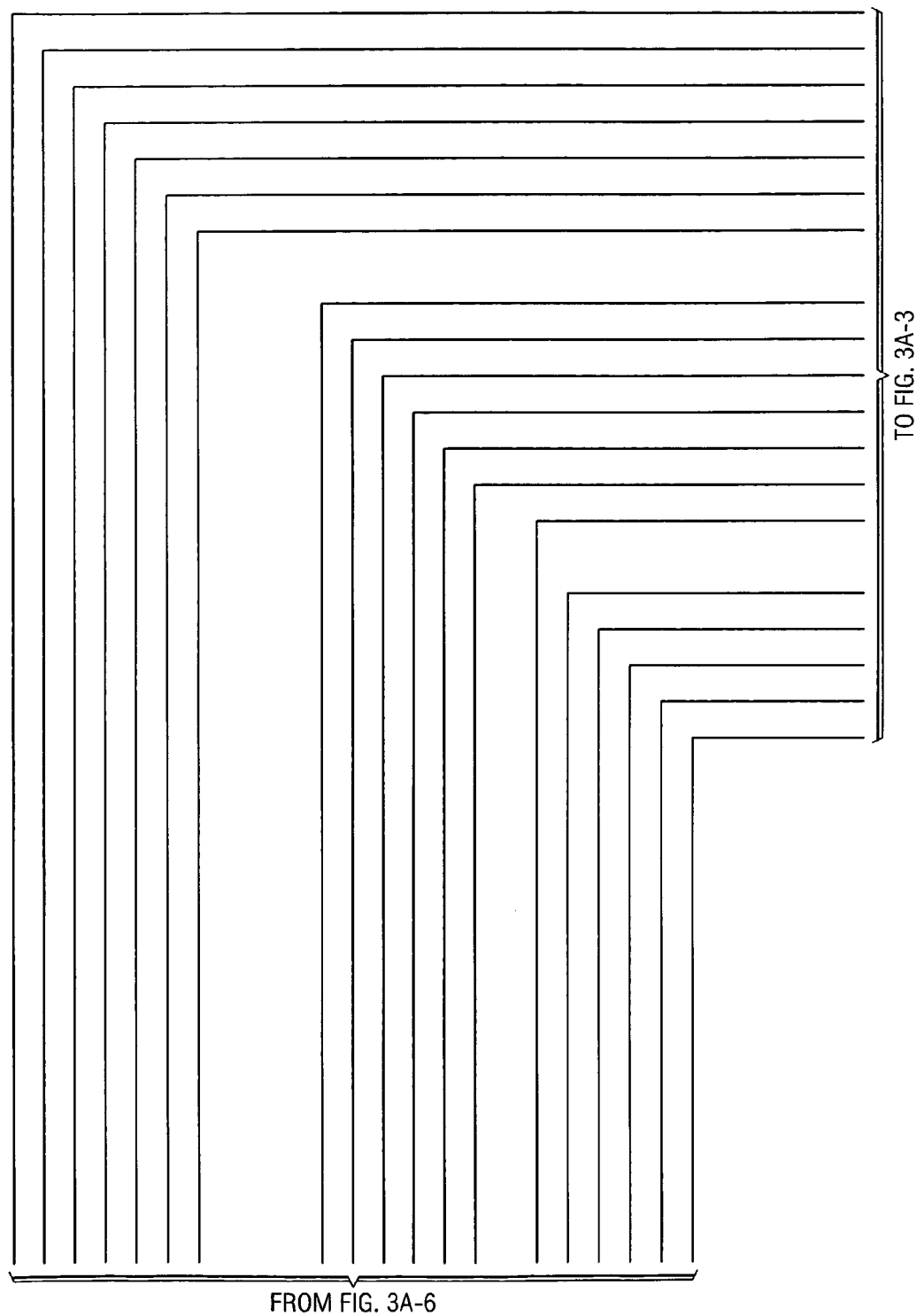
Figures 3, 3A:
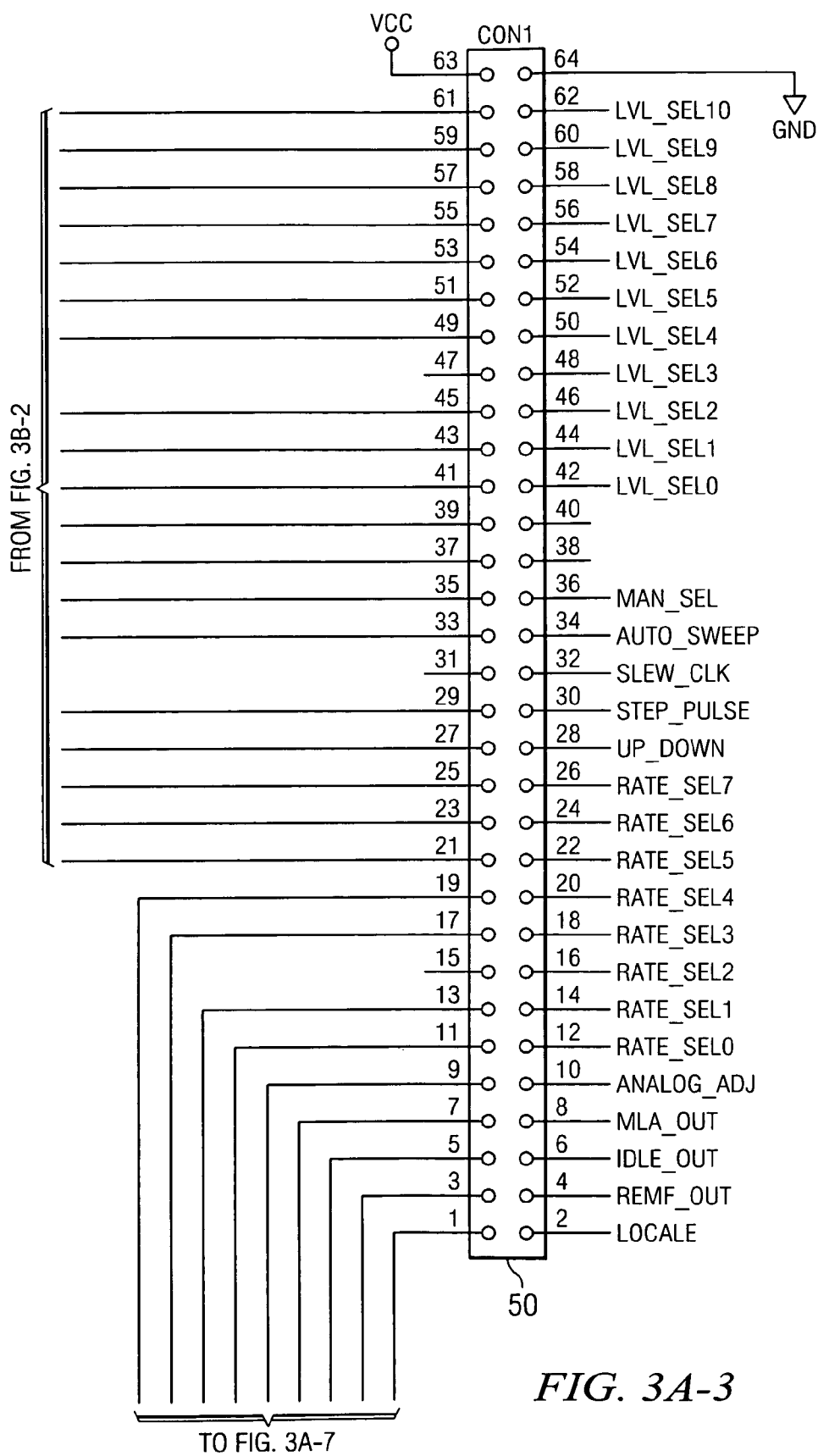

With reference to FIG. 3, the apparatus 10 can be controlled from the control panel 20 or by a remote control systems, such as the GPIB system. When operated by remote control, an MLA address entered into a dip switch 44 informs the PLD of the proper address for the remote control channel controlling the apparatus 10. When the proper address is provided, the remote control operates the settings of the apparatus 10 through connector 46. When using the GPIB standard, a 75161 line driver may be necessary.

If controlled from the control panel 20, the operator will be required to input a desired final value of attenuation. This can be done by closing selected switches 22 a-e. For example switch 22a may be 40 dB attenuation, switch 22b may be 20 dB attenuation, switch 22c may be 10 dB attenuation, switch 22d may be 5 dB attenuation, and switch 22e may be 2.5 dB attenuation. A combination of switches 22 can be selected to attenuate at additional values, for example closing switches 22a, 22b and 22c to achieve 40+20+10=70 dB attenuation. Closing selected switches 22 provides system voltage Vcc to selected pins in the PLD 38 through a connector 50. Alternatively, the operator can rotate attenuation control knob 28, which is attached to an optical encoder, to set the attenuation.

An important feature of the apparatus 10 is the ability for the operator to then select different rates for the apparatus 10 to change from the current attenuation setting in the apparatus 10 to the desired final value of attenuation. For example, the operator can select a desired attenuation rate at rate selection switch 26. Rate selection switch 26 can represent attenuation rates of 40, 80, 160, 320, 640, 1280, 2560 and 5120 dB per second, respectively.

A remote control system would similarly set in the desired final value of attenuation and attenuation rate.

While the PLD 38 is preferred, the apparatus can use a custom designed chip or discrete hardwired components to achieve the same results obtained by the PLD 38. PLD 38 has the advantage of being reprogrammable to allow modifications of the operation of the apparatus depending on customer needs. Also, while remote control with a GPIB system is described, the remote control can be achieved with RS 232, parallel port or other control system.

The apparatus 10 provides great flexibility to the operator in testing the receiver 18. By controlling not only the final value of attenuation of the signal input into the receiver, but also the rate the attenuation changes from the initial value of attenuation in the apparatus 10 to the final value of attenuation selected, the operator can not only test the sensitivity of the receiver, but also its response to a controlled rate of change in signal strength to test the slew rate of the receiver.

Figures 3, 3A, 4, 5:
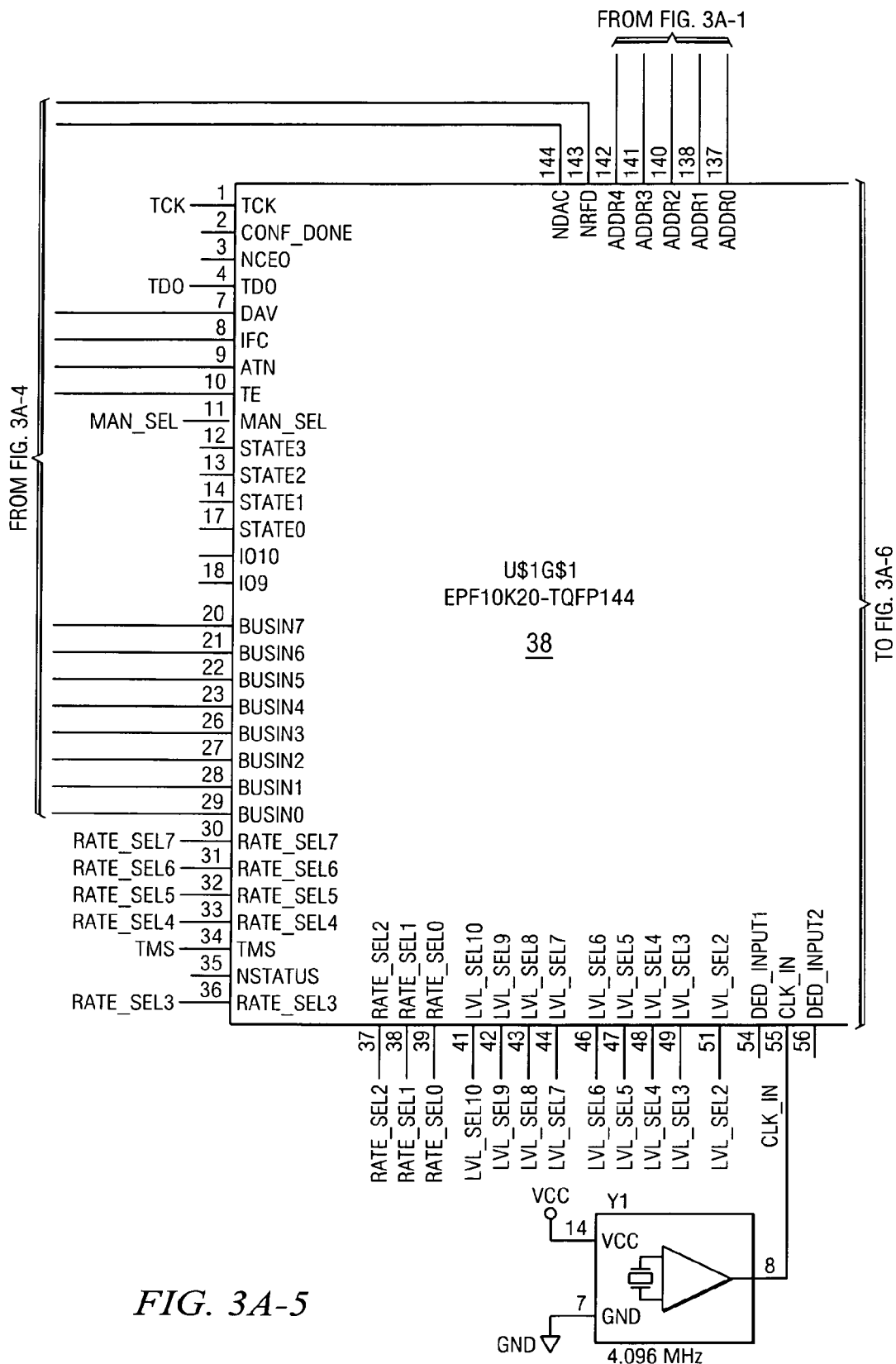
FIG. 4 is the logic of the apparatus.
Figures 3, 3A, 4, 5, 6:
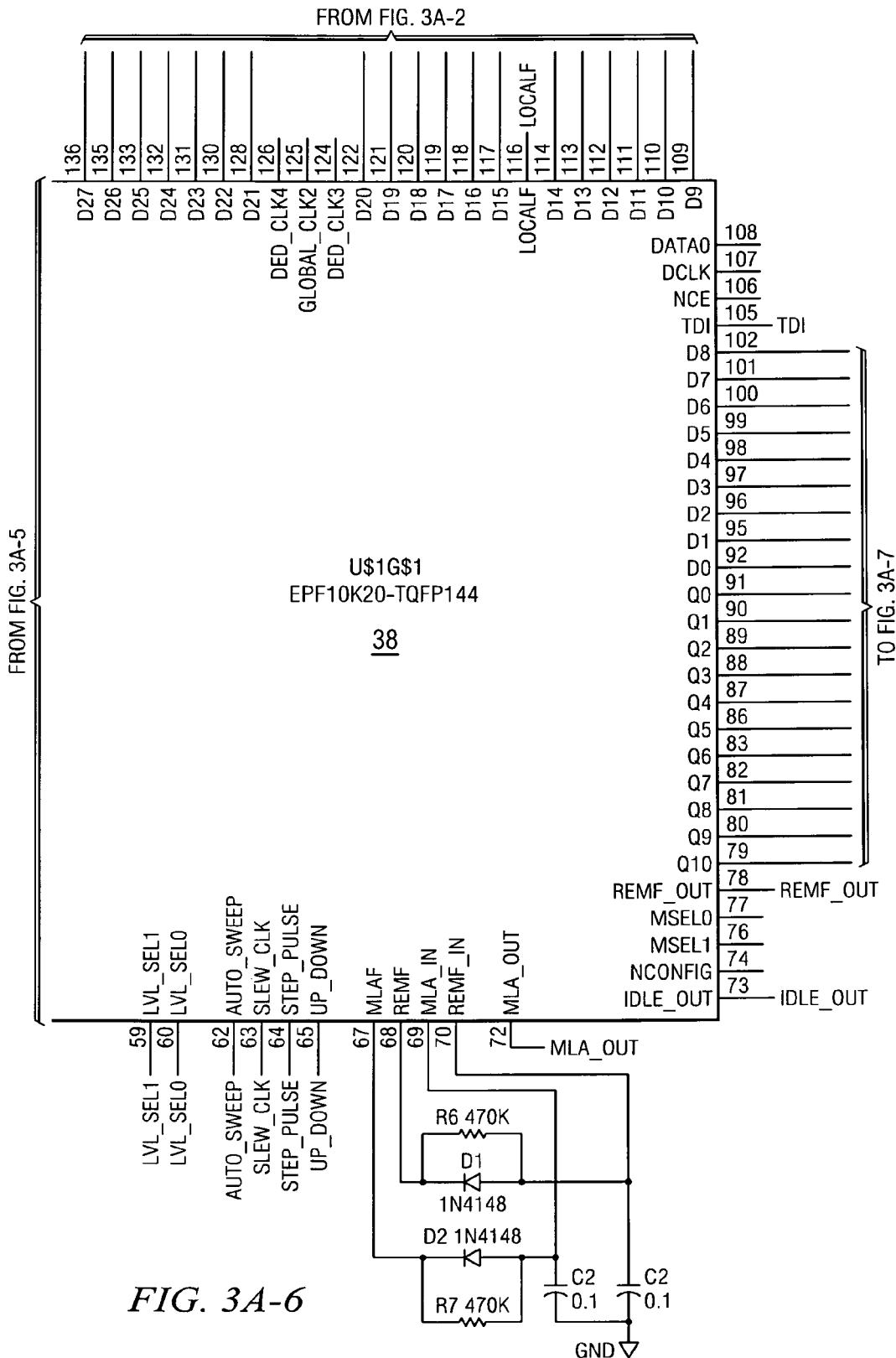
Figures 3, 3A, 4, 5, 6, 7:
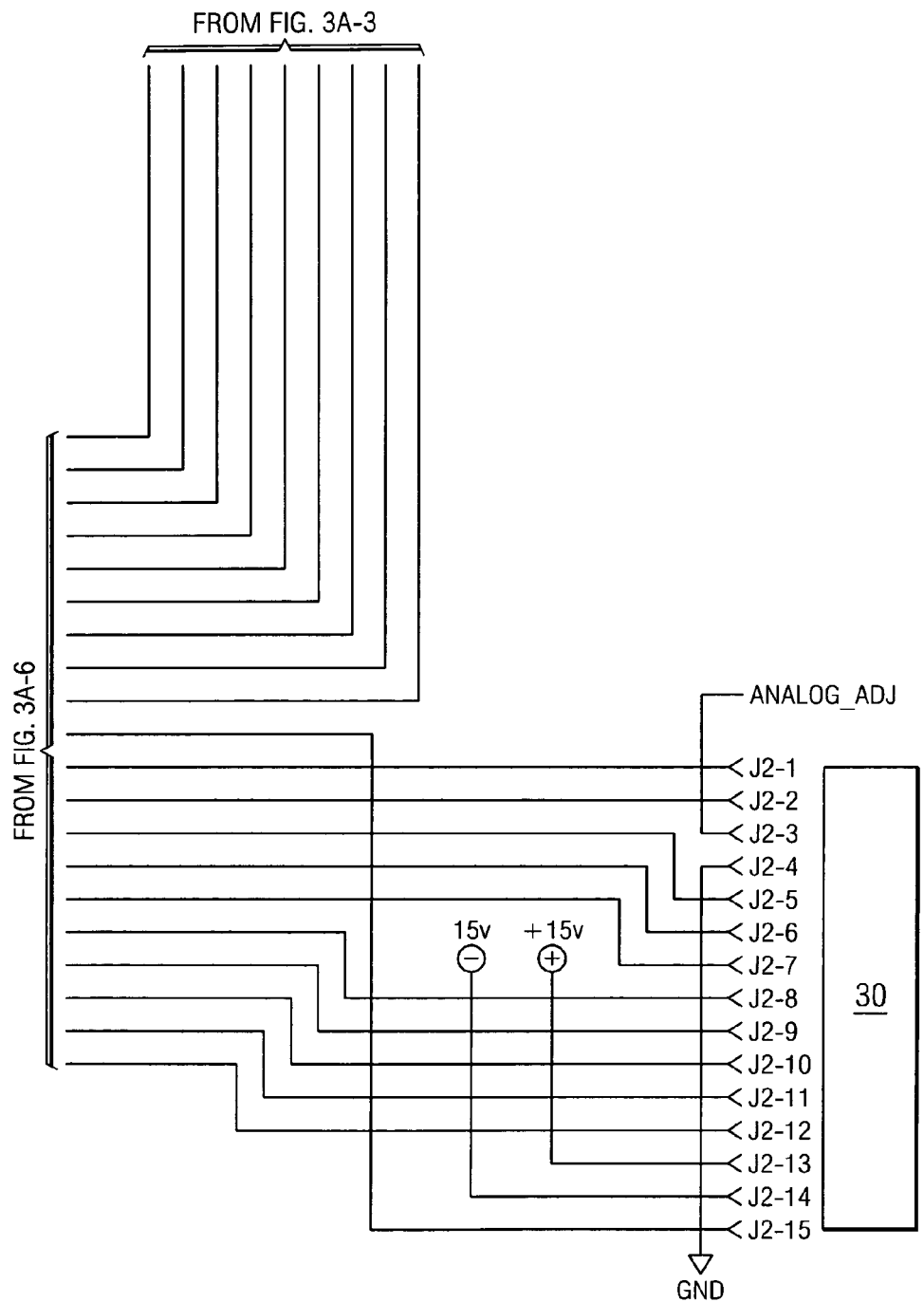
Figure 3B:
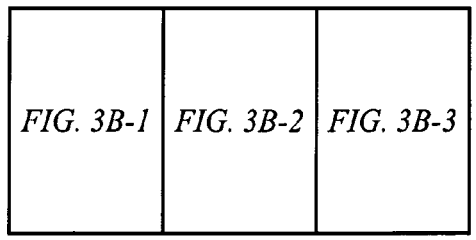
Figures 1, 3B:
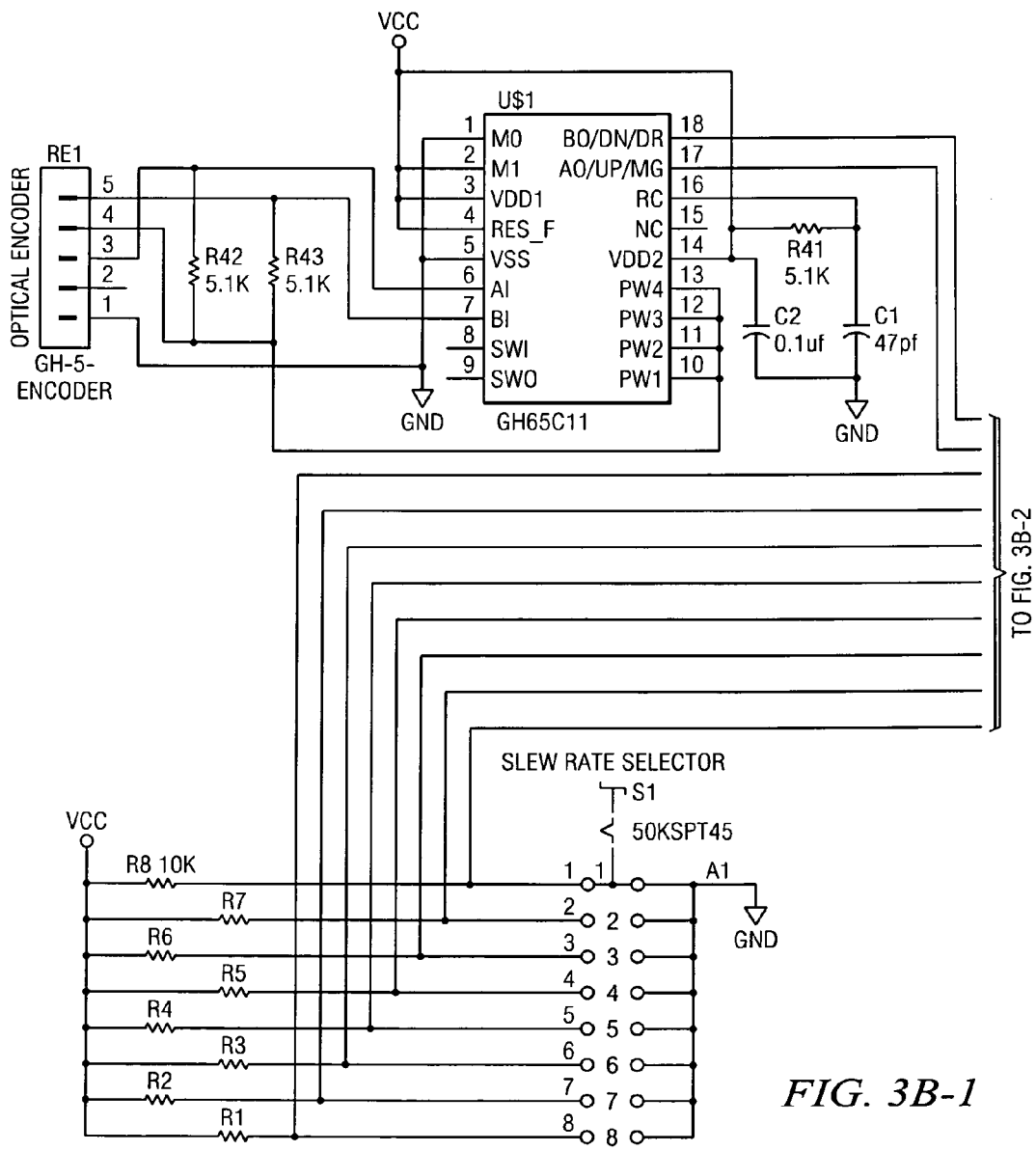
Figures 2, 3B:
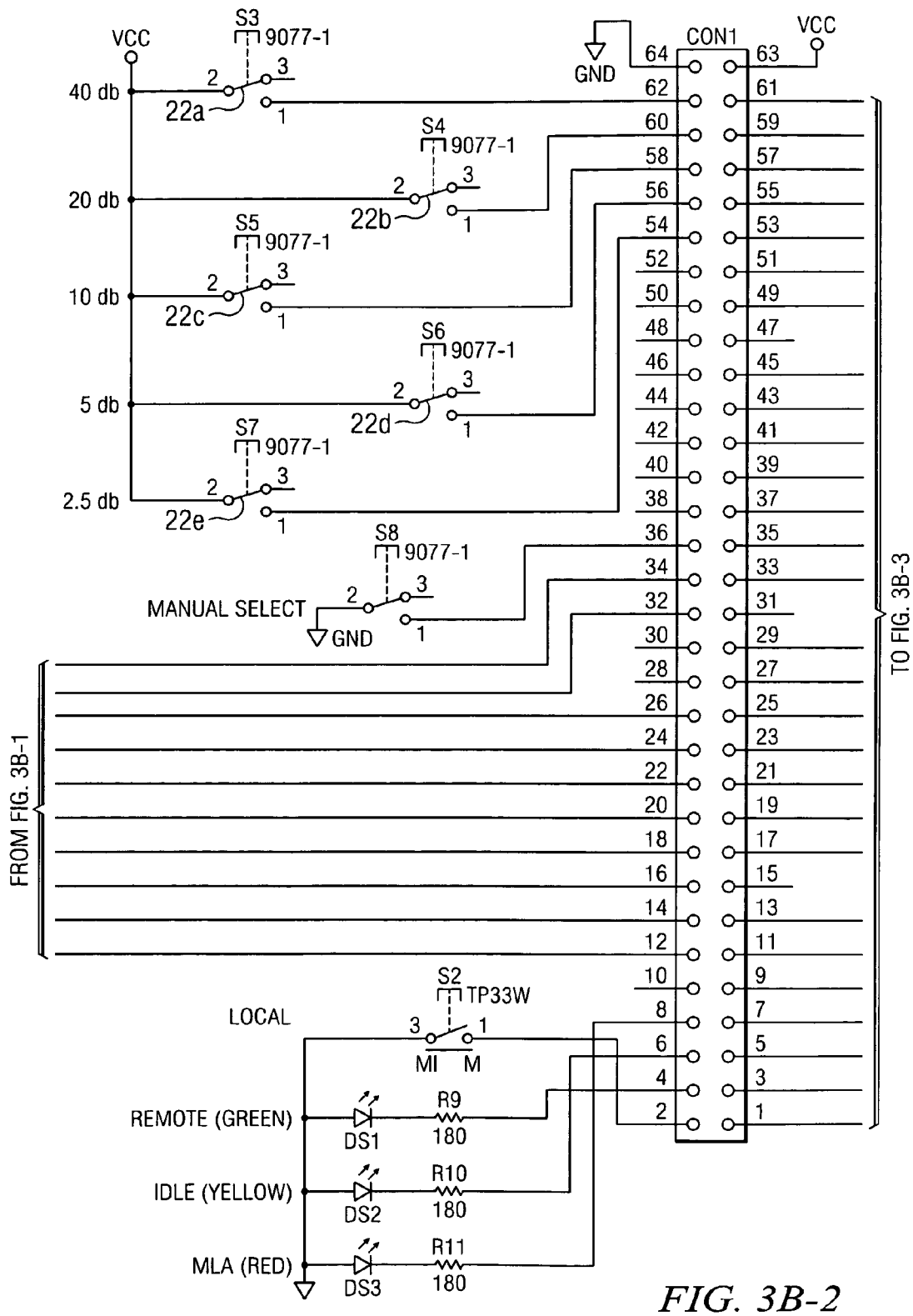
Figures 3, 3B:
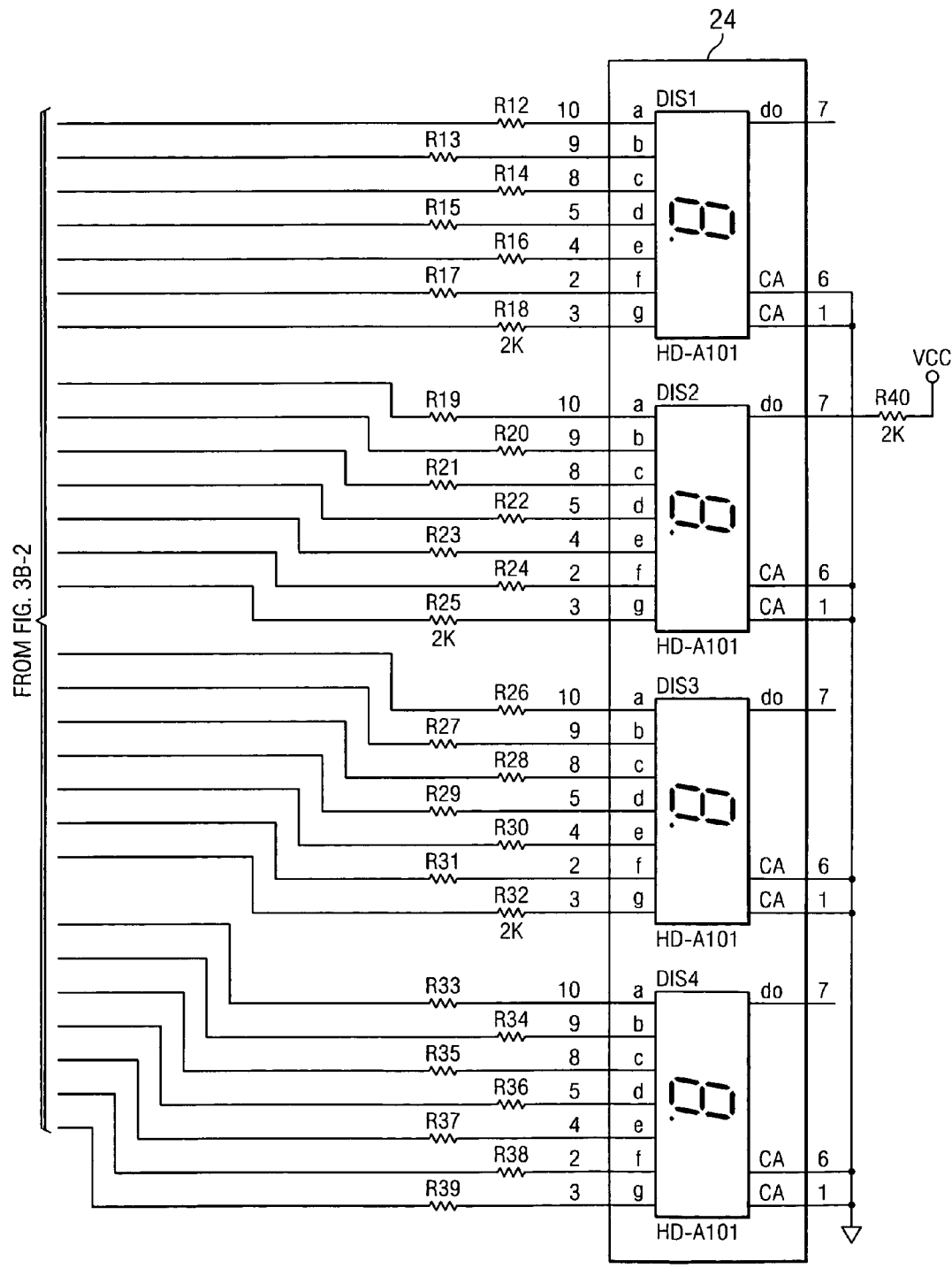
Figure 4:
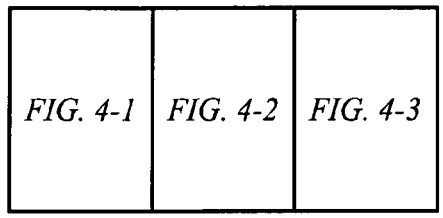
Figures 1, 4:
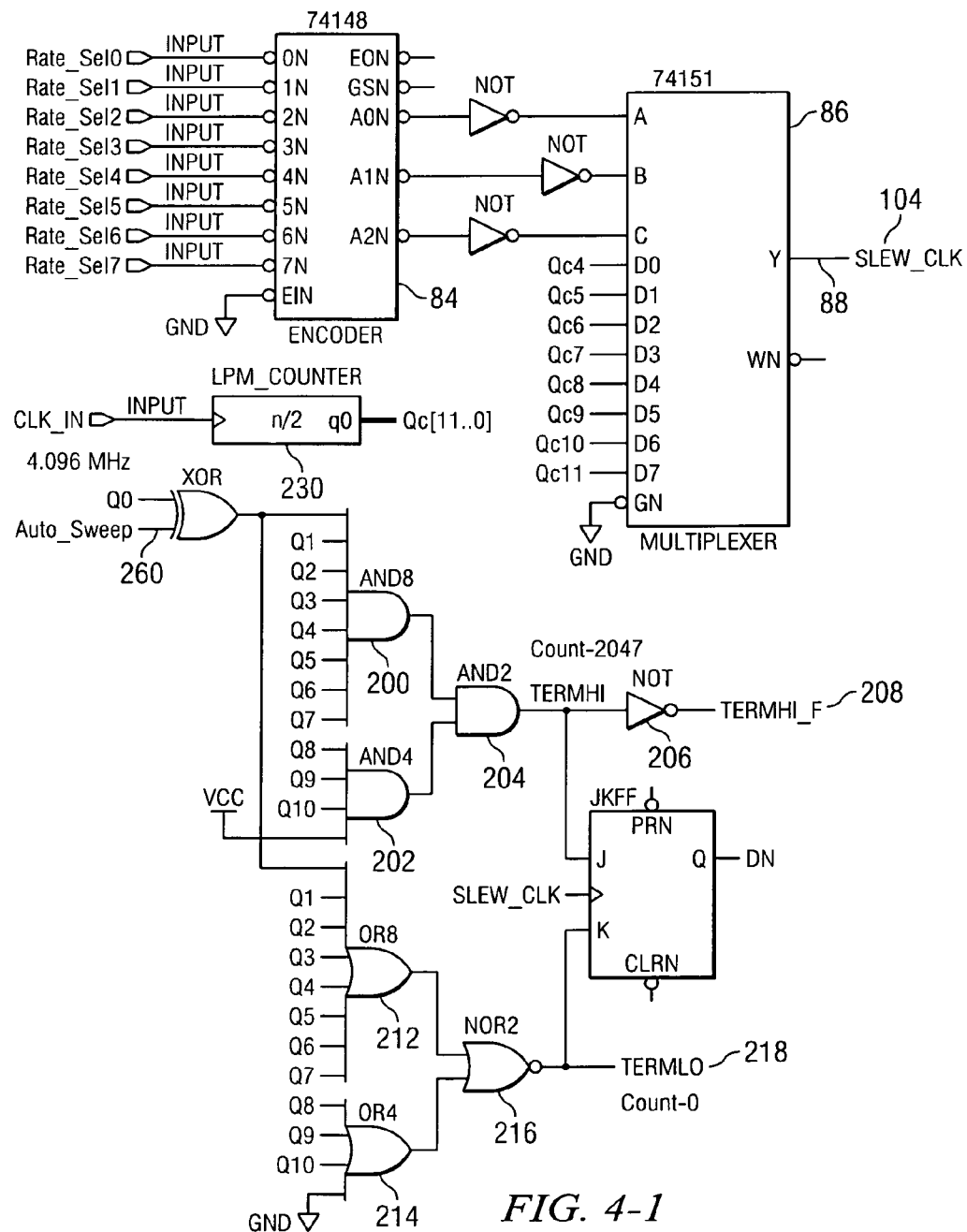
Figures 2, 4:
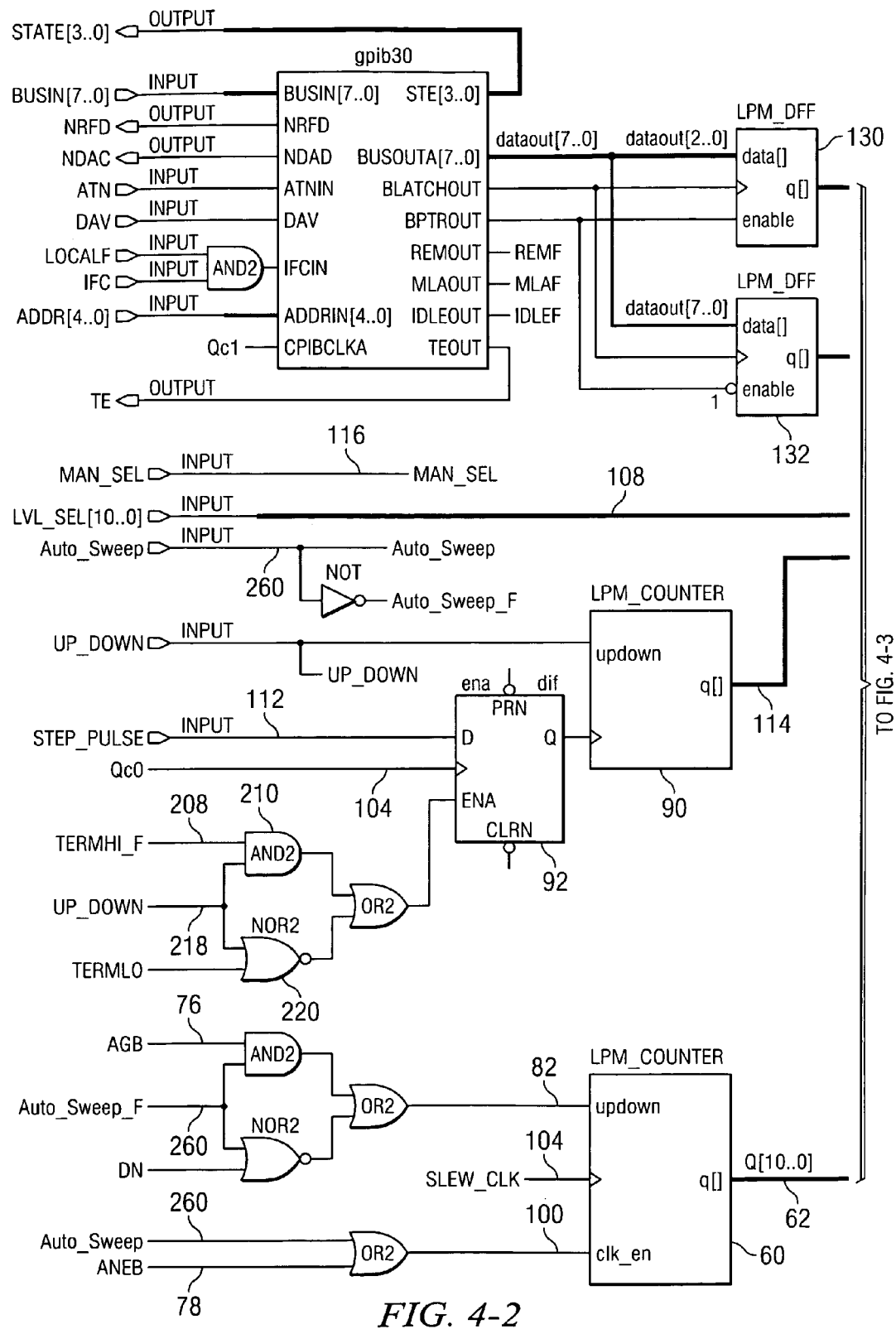
Figures 3, 4:
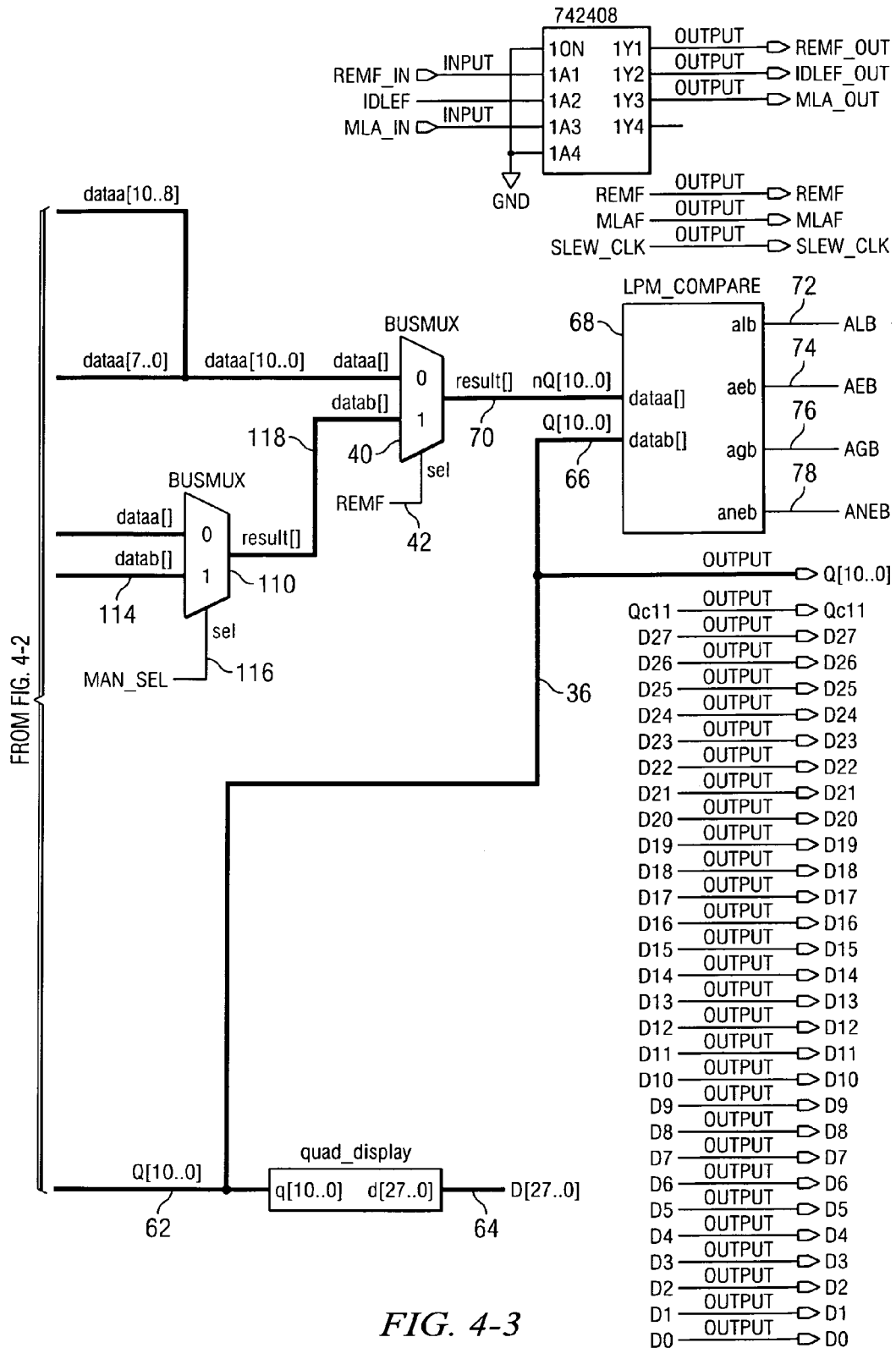

With reference to FIG. 4, the control logic of the PLD 38 will be described. Preferably, the logic is implemented by the LPM standard which can be incorporated into the Altera PLD noted above. A multiplexer 40 determines if apparatus 10 is controlled by remote control or control panel 20 depending on the input voltage level to select input 42 of multiplexer 40. The LPM counter 60 has an output 62 which is connected to the control input 36 of the attenuator 30 and instructs the attenuator 30 what attenuation is to be set. In addition, the output 62 connects to a series of inputs 64 which control the digital display 24 to display the attenuation. The output 62 also forms the "b" input 66 to an LPM comparator 68. Comparator 68 compares the "a" input 70 representing the desired attenuation setting to the "b" input 66 representing the actual attenuation setting in the attenuator 30. The LPM comparator generates an output at the "a" is less than "b" (ALB) output 72 if this condition is met, the "a" equals "b" (AEB) output 74 if this condition is met, the "a" is greater than "b" (AGB) output 76 if this condition is met and "a" does not equal "b" (ANEB) output 78 if this condition is met. If "a" does not equal "b", the output 78 forms an input 78 to the clock enable input 100 of the LPM counter 60 to begin to count up or down to change the value of attenuation. The counter counts up or down, to increase or decrease the attenuation, depending on the condition of the "a" is greater than "b" output 76, forming input 82 to the updown input to LPM counter 60. The LPM counter 60 counts up or down to change the attenuation in the attenuator 30 until the LPM comparator 68 shows the actual attenuation value equals the desired value. If the signal on the control input 36 has reached the highest value for the 11 bit input, ie 11111111111, all inputs Q0 to Q10 entering AND gates 200 and 202 will be high and the inputs to AND gate 204 will be high, causing inverter 206 to go low and transmit the low signal on line 208 denoted TermHi. Line 208 is one input to an AND gate 210 which causes the LPM counter 90 to switch to counting down. Similarly, if the signal on the control input 36 has reached the lowest value for the 11 bit input, ie 00000000000, all inputs Q0 to Q10 entering OR gates 212 and 214 will be low and the inputs to OR gate 216 will be low, causing the output of OR gate 216 to go high and transmit the high signal on line 218 denoted TermLo. Line 218 is one input to a NOR gate 220 which causes the LPM counter 90 to switch to counting up.

The rate the LPM counter 60 changes the attenuation setting in the attenuator 30 is determined by the slew clock input 104, which is in turn determined by the rate input by the operator either by remote control or on the control panel 20. The output of rate switch 26 is input into a 74148 encoder 84. The encoder 84 sends the value of the selected rate to a 74151 multiplexer 86. A clock source, such as a 4.096 M Hz crystal, is input into LPM counter 230. The LPM counter takes the input signal and outputs a series of clocks signals which are divided by powers of 2. For example, output Qc0 may be 2.048 M Hz, output Qc1 may be 1.024 M Hz, down to Qc10 may be 2 K Hz and Qc11 may be 1 K Hz. With an attenuator 30 that has steps of 0.04 dB/step, 1,000 steps up or down/sec at the clock rate of Qc11 would correspond to a rate of 40 Db/sec. Of course, any change of attenuation rate can be chosen by setting the clock source and output Qc as needed, limited only by the ability of the attenuator 30 to change attenuation. The value input from encoder 84 selects which of the clock rates Qc4 to Qc11 is the output 88 of multiplexer 86. The output 88 forms a slew clock signal 104 which is input into LPM counter 60 and LPM counter 90 to change the attenuation at the rate selected.

If the final value of attenuation is set from the control panel, it is set by either switches 22a-e or by attenuation control knob 28, depending on the position of a manual select switch 250. The attenuation set by the switches 22a-e is input on level select line 108 to a multiplexer 110. The optical encoder output controlled by the attenuation control knob 28 is on line 112 which enters a D flip-flop 92. The output of D flip-flop 92 forms the clock input for the LPM counter 90. The output of LPM counter 90, in turn, forms the second input 114 to multiplexer 110. The manual select switch 250 sets the state of the manual select line 116. The state of the manual select line 116 determines if the attenuation switches 22a-e or attenuation control knob 28 determines the output 118 of the multiplexer 110. The output 118 forms one of the two inputs to the multiplexer 40, the other input being formed by the signal from the remote control system. The output of the multiplexer 40, which represents the desired final value of attenuation, forms the input "a" to the LPM comparator 68.

The remote control system input is passed through two LPM D flip-flops 130 and 132 before input into the multiplexer 40.

The apparatus 10 can be used to test signals in the 1.0 to 18.0 GHz range, and particulary in the 6.0 to 12.0 GHz range.

One advantage of the present invention is the ability to shift quickly between two different final attenuation values at the desired rate by simply flipping the manual select switch 250 back and forth to switch the output of the Multiplexer 110 between the level select line 108 and input 114. For example, the switches 22a-e could be set to 40 dB attenuation and the attenuation control knob 28 set to 60 dB attenuation. The apparatus can then be quickly shifted from a final attenuation of 40 dB to 60 dB and back to 40 dB simply by flipping the switch 250.

An autosweep signal can be input on lines 260 which causes the apparatus to oscillate between minimum attenuation and maximum attenuation at the set rate.

The apparatus 10 preferably changes attenuation at the desired rate the instant the operator or remote control system inputs a final attenuation value different than that set in the attenuator 30. However, the apparatus 10 can be programmed to execute a series of attenuation changes and rates to perform a set sequence of testing levels and can initiate the attenuation change selected on the apparatus by pressing a go button or by automatically starting the change after a set delay.

While the apparatus 10 is shown mounted within a separate enclosure having a control panel 20 with hand operated controls, the apparatus 10 can be integral with any circuit or device with which the apparatus will be used, and all control of the apparatus 10 can be done by remote control signals. All of the external controls and displays are not actually needed and are optional. The control logic in the chip could be integrated into any design without having external manual controls or displays. The external controls are only needed where human interaction is required.

Depending on implementation of the apparatus 10, an external input for the final attenuation value can be used, or the final attenuation value can be stored in the PLD 38 or other chip used. If the apparatus 10 is integrated into a loop or feedback circuit, an external sensing circuit will tell the PLD 38 to changed the attenuation value up or down utilizing the external input pins, depending on the incoming receive signal strength. The rate of change (dB per second) can be fixed or variable. If the rate of change is fixed, the control inputs can be nailed up or pulled up (ie tie the input or inputs using pull up resistors to a logic level 1) with external input pins to the PLD or internal to the PLD. If it is desired that the rate of change be variable, external input pins can be used as needed by an external control circuit.

Another example of where the apparatus 10 could be used is at a receiver input, where there is 5 dB or more of excess fade margin available. A circuit monitoring the incoming signal strength could be setup to adjust the attenuation to counteract level changes of the incoming signal to the receiver. This could be done by having the attenuator adjust the receiver input level down to a point that is still a comfortable operating level and, when the incoming signal to the receiver is changing rapidly up or down, the attenuator will do the opposite. For example, if the incoming signal strength to the receiver were to drop 5 dB rapidly (ie 2500 dB per second, which could potentially break receiver phase lock), a corresponding 5 dB reduction in attenuation at the same rate (ie 2500 dB per second) would result in a 0 dB change of signal at the input of the receiver.

While a single embodiment of the present invention has been illustrated in the accompanying Drawings and described in the foregoing Detailed Description, it will be understood that the invention is not limited to the embodiment disclosed, but is capable of numerous rearrangements, modifications and substitutions of parts and elements without departing from the scope and spirit of the invention.

The invention claimed is:

1. An apparatus for controlling an attenuator, the attenuator having a signal input and a signal output, the attenuator attenuating the signal in discrete steps to a degree determined by a control signal input to the attenuator, comprising:
a first control having an input for the desired final attenuation value for the signal and a second control having an input for the desired rate of change of attenuation to achieve the desired final attenuation value, a third control for varying the control signal in discrete steps to vary the attenuation of the attenuator in discrete steps to control the rate of change of attenuation of the attenuator to the desired rate and the final attenuation to be the desired final attenuation value of the signal input, the setting of the attenuator to the desired final attenuation value being subsequent to varying the attenuation of the attenuator in said discrete steps, the inputs to the controls for the desired final attenuation value and the desired rate of change of attenuation being set at values which can be independent of the signal input to the attenuator.

2. The apparatus of claim 1 wherein the second control has a rate switch for operator input of the desired rate of change of attenuation.

3. The apparatus of claim 1 wherein the first control has a plurality of attenuation switches for operator input of the desired final attenuation value of the input signal.

4. The apparatus of claim 1 wherein the first control has an attenuation control knob controlling an optical encoder for varying the desired attenuation.

5. The apparatus of claim 1 wherein the second control permits a desired rate of change of attenuation varying from 40 dB per second to 5120 dB per second.

6. The apparatus of claim 1 wherein the desired final attenuation value of the input signal varies between 0 dB and about 80 dB.

7. The apparatus of claim 1 wherein the controls have a GPIB interface.

8. The apparatus of claim 1 wherein the controls have a display for displaying the attenuation of the attenuator.

9. The apparatus of claim 1 wherein the controls are a programmable logic device.

10. The apparatus of claim 1 wherein the attenuation steps at 0.04 dB increments.

11. The apparatus of claim 1 wherein the attenuation is stepped with sufficiently small steps to be comparable to a continuously variable attenuator.

12. The apparatus of claim 1 further comprising a master clock, and dividers to divide the clock frequency to achieve different rates of change of attenuation.

13. The apparatus of claim 9 wherein the desired final attenuation value for the signal and the desired rate of change of attenuation to achieve the desired final attenuation value are stored in the programmable logic device.

14. The apparatus of claim 9 wherein the control logic in the programmable logic device relies on no external controls.

15. An apparatus for controlling an attenuator, the attenuator having a signal input and a signal output, the attenuator attenuating the signal in discrete steps to a degree determined by a control signal input to the attenuator, comprising:

a first control having an input for the desired final attenuation value for the signal and a second control having an input for the desired rate of change of attenuation to achieve the desired final attenuation value, a third control for varying the control signal in discrete steps to vary the attenuation of the attenuator in discrete steps to control the rate of change of attenuation of the attenuator to the desired rate and the final attenuation to be the desired final attenuation value with the attenuation of the input signal stepped with sufficiently small steps to effectively be a continuously variable attenuator, the setting of the attenuator to the desired final attenuation value being subsequent to varying the attenuation of the attenuator in said discrete steps, the inputs to the controls for the desired final attenuation value and the desired rate of change of attenuation being set at values which can be independent of the signal input to the attenuator.

16. The apparatus of claim 15 wherein the third control varies the control signal to change the attenuation of the attenuator without skipping any of the attenuation steps of the attenuator.

17. The apparatus of claim 16 wherein the attenuator has attenuation steps of 0.04 dB.

18. The apparatus of claim 1 wherein the frequency range of the attenuated signal is between 1.0 and 18.0 G Hz.

19. The apparatus of claim 1 wherein the inputs to the controls for the desired final attenuation value and the desired rate of change of attenuation are set at values independent of a device receiving the signal output of the attenuator.

20. The apparatus of claim 1 wherein signal input is unknown and the inputs to the controls for the desired final attenuation value and the desired rate of change of attenuation are set prior to achieving the desired final attenuation value, the attenuator requiring a digital control signal input, the third control providing a digital control signal to the attenuator.

* * * * *